United States Patent [19]

Kurosawa

[11] 4,264,952
[45] Apr. 28, 1981

[54] INVERTER APPARATUS
[75] Inventor: Ryoichi Kurosawa, Tokyo, Japan
[73] Assignee: Tokyo Shibaura Denki Kabushiki Kaisha, Kanagawa, Japan
[21] Appl. No.: 3,536
[22] Filed: Jan. 15, 1979
[30] Foreign Application Priority Data
  Jan. 23, 1978 [JP] Japan .................. 53-5293
[51] Int. Cl.³ .......................... H02M 7/515
[52] U.S. Cl. ................................. 363/138
[58] Field of Search ............... 363/136–139; 307/252 M; 318/345 C, 811

[56] References Cited
U.S. PATENT DOCUMENTS

| 3,207,974 | 9/1965 | McMurray | 363/136 |
| 3,399,336 | 8/1968 | Koppelmann | 363/138 |
| 3,612,973 | 10/1971 | Kuniyoshi | 363/137 |
| 3,707,668 | 12/1972 | Johnston | 363/137 |
| 3,781,645 | 12/1973 | Grom et al. | 363/138 |
| 3,980,941 | 9/1976 | Griebel | 363/138 |
| 4,032,831 | 6/1977 | Nabae et al. | 363/2 |
| 4,072,882 | 2/1978 | Wiart et al. | 363/138 X |
| 4,079,443 | 3/1978 | Udvardi-Lakos et al. | 363/138 |
| 4,156,899 | 5/1979 | Matsuda et al. | 363/138 |

FOREIGN PATENT DOCUMENTS 42-15061 8/1967 Japan .
'601789 4/1978 U.S.S.R. .................. 363/137

Primary Examiner—William M. Shoop
Attorney, Agent, or Firm—Stevens, Davis, Miller & Mosher

[57] ABSTRACT

In an inverter apparatus having at least two positive side main semiconductor switching elements and at least two negative side main semiconductor switching elements, the output terminals of the apparatus provided between the positive-side elements and the negative-side elements, respectively. A positive-side commutating circuit, a negative-side commutating circuit, and positive-side and negative-side phase selective, current circulating, semiconductor elements are provided separately for controlling the commutation of the positive-side and negative-side main semiconductor switching elements, respectively.

11 Claims, 9 Drawing Figures

HATCHED BLOCKS CORRESPOND TO CHOPPER PERIODS OF THE ELEMENTS INDICATED IN THE BLOCKS.

WHITE BLOCKS CORRESPOND TO CONDUCTIVE PERIODS OF THE ELEMENTS INDICATED IN THE BLOCKS.

INVERTER APPARATUS

BACKGROUND OF THE INVENTION

This invention relates to inverter apparatus, and more particularly to an improved type inverter apparatus capable of providing a polyphase output of variable voltage and variable frequency, which is adapted for driving an AC motor from a DC power source.

Known is a voltage-type inverter, one example of which having a three-phase output is indicated in FIG. 1 of the accompanying drawings.

This inverter comprises main thyristors M1 through M6 of a so-called reverse-conductive type and commutating circuits associated therewith, the latter circuits comprising auxiliary thyristors A1 through A6, commutation capacitors C1 through C3, and commutation reactors L1 through L3, respectively. Output terminals U, V, and W, from which the three-phase AC output of the inverter is obtainable, are provided between the main thyristors M1 and M2, M3 and M4, and M5 and M6, respectively.

This type of inverter apparatus has advantageous features in that a pair of main thyristors, such as M1 and M2, connected in series across a DC power source E are commutated efficiently under the co-operation of a commutating capacitor C1 and a commutating reactor L1, by utilizing the reversed electric charge in the capacitor C1, and that in response to the load current commutated by the aid of the commutating reactor L1, the commutating capacitor C1 is charged to a voltage higher than the power source DC voltage, thereby increasing the commutation limit of the inverter apparatus automatically.

However, when this type of inverter apparatus is used for driving an AC motor, a wide variation in rotating speed of which requires a wide variation of the output voltage of the inverter, or requires an output of a sinusoidal waveform, such as obtainable by a pulse-width modulation, instead of the conventional rectangular waveform, so that a number of current chopping operations must be carried out within one cycle period of the AC output. In this case, when a main thyristor, for inslance, M1 is turned off by any reason, the load current cannot be interrupted instantaneously because of the inductance in the AC motor, but the load current is passed through the diode portion of the main thyristor M2. Although the load current can then flow through the main thyristor M1 when it conducts again, the immediately subsequent chopping of the main thyristor M1 is not possible because of the reversed charge in the commutating capacitor C1.

To eliminate this difficulty, it is required to render conductive the auxiliary thyristor A2 before the ignition of the main thyristor M1, thereby reversing the electric charge in the capacitor C1. Such a procedure, however, makes it impossible to utilize alternately the reversed electric charge in the commutating capacitor, which has constituted the first advantageous feature of this type of inverter.

Furthermore, in accordance with recent increase in the capacity and the output voltage of the inverter apparatus, the main thyristors M1 through M6 tend to be operated near their breakdown voltage, with the result that the commutating capacitors tend to be over-charged. As a result, the breakdown voltage of the auxiliary thyristors A1 through A6 must be increased by for instance connecting a number of identical elements in series, and the afore-mentioned variable commutation limit depending upon the variation in the load current, which constituted the second advantageous feature of this type of inverter apparatus, has now turned to be a disadvantageous feature.

Even in the case of operating the inverter apparatus at a comparatively low voltage, since the variation of the commutation limit depends much on power losses in the commutation capacitors and commutation reactors, it is difficult to measure the variation of the commutation limit precisely, and therefore the advantageous feature cannot be fully utilized in the design of the inverter.

In FIG. 2 of the accompanying drawings, there is indicated an example of a conventional current-type inverter wherein the output current is self-controlled within the own apparatus. In this example, there are provided six choppers CH1 through CH6 comprising main thyristors M1 through M6 of the reverse-conductive type, and commutating circuits, associated with the main thyristors, comprising auxiliary thyristors A1 through A6, also of the reverse-conductive type, commutating capacitors C1 through C6, and commutating reactors L1 through L6, respectively. Between the two choppers CH1 and CH2, CH3 and CH4, and CH5 and CH6, which are connected in series between the positive and negative buses of a DC power source E, are connected in series smoothing reactor pairs, LD1 and LD2, LD3 and LD4, and LD5 and LD6. Phase selecting and current circulating thyristors S1 through S6, are inserted between the choppers CH1 through CH6 and the positive and negative buses, respectively, and output terminals U, V, and W are provided intermediately of the smoothing reactor pairs, LD1 and LD2, LD3 and LD4, and LD5 and LD6.

In this type of the inverter apparatus, the main thyristors M1 through M6 in the choppers are on-off controlled at every electric angle of 60°, that is, at every 1/6 of one cycle period of the output frequency. In other words, the output frequency is determined by the on-off control of the main thyristors such that the current is commutated from one phase to the other, and the output current is controlled by changing the time ratio of the entire on-periods in each phase against the 60°-chopper period.

Thus, in the conventional current-type inverter, the output frequency and output current can be controlled within the apparatus, itself and therefore the DC power source E may be of a constant voltage type which can be easily constituted by an ordinary diode thpe rectifier device which can preduce such an output from a conventional three-phase AC power line at a high efficiency and a high power factor.

Furthermore, this type of inverter apparatus has an advantageous feature of enabling to provide a fast current control as a result of the utilization of the chopper circuits.

However, in the inverter apparatus shown in FIG. 2, there is a possibility that the potential of the U-phase output terminal would be reduced to a value lower than that of the negative bus due to an induced voltage in the AC motor when, for instance, the main thyristor M1 and the phase selecting and current circulating thyristor S1 are both in off state. Therefore the commutation capacitor C1 is over-charged through the auxiliary thyristor A1, the latter feature requiring to increase the breakdown voltage of the auxiliary thyristors A1 through A6 than in the previous example. In addition, the provision of a commutating circuit for each chopper complicates the construction thus increasing the manufacturing cost of the inverter apparatus. Furthermore, as is apparent from FIG. 3, since the operation period of each chopper is only for an electrical angle of 60°, such an arrangement was found to be inefficient as to the commutating circuit.

SUMMARY OF THE INVENTION

A fundamental object of the present invention is to provide an inverter apparatus wherein the aforementioned difficulties of the conventional inverter apparatus can be substantially eliminated.

Another object of the invention is to provide an inverter apparatus wherein any possibility of over-charging the commutation capacitors can be substantially eliminated.

Still another object of the invention is to provide an inverter apparatus wherein commutation circuits are provided as integral units.

Still another object of the invention is to provide an inverter apparatus which can be operated from a simplified power source of a constant DC output voltage, and hence the power factor of the power source can be substantially improved.

Still another object of the invention is to provide an inverter apparatus wherein the initial charging of the commutation capacitors is facilitated and the commutation period of the inverter is not affected by the load current and the output voltage, and furthermore, the apparatus can operate at a high frequency.

Still another object of the invention is to provide an inverter apparatus wherein the output waveform is substantially improved, the control of the output current is quick, and the cummutation voltage is substantially constant.

A further object of the present invention is to provide an inverter apparatus wherein the commutating operation is assured, the break-down voltage of the main thyristors is lowered, and the commutation circuits are provided independently on the positive side and negative side so that the apparatus can be easily protected against accidental failures, and is suitable for the application of heavy load and high voltage.

According to the present invention, there is provided an inverter apparatus comprising: at least two positive-side main semiconductor switching elements, the anode electrodes thereof being connected to a positive bus; at least two negative-side main semiconductor switching elements, the cathode electrodes thereof being connected to a negative bus; positive-side phase selective, current circulating, semiconductor elements of a unidirectional conductivity type, the anode electrodes thereof being commonly connected together and the cathode electrodes thereof being connected respectively to the cathode electrodes of the positive-side main semiconductor switching elements; negative-side, phase selective, current circulating, semiconductor elements of a unidirectional conductivity type, the cathode electrodes thereof being commonly connected together and the anode electrodes thereof being connected respectively to the anode electrodes of the negative-side main semiconductor switching elements; a positive side commutating circuit including a commutating capacitor for supplying a reverse current to each of the positive-side main semiconductor switching elements through corresponding one of the positive-side, phase selective, current circulating, semiconductor elements of a unidirectional conductivity type from said positive bus during the commutation period of the positive-side main semiconductor switching elements; a negative-side commutating circuit including a commutating capacitor for supplying a reverse current to each of the negative-side main semiconductor switching elements through the corresponding one of the negative-side, phase selective, current circulating, semiconductor elements of a unidirectional conductivity type from the negative bus during the commutation period of the negative-side main semiconductor switching elements; a positive-side circulation-clamping diode, the anode electrode thereof being connected to the negative bus, and the cathode electrode thereof being connected to the positive-side commutating circuit, for preventing the commutating capacitor of the positive-side commutating circuit from being overcharged, and a negative side circulation clamping diode, the cathode electrode thereof being connected to the positive bus, and the anode electrode thereof being connected to the negative-side commutating circuit, for preventing the commutating capacitor of the negative-side commutating circuit from being overcharged; the cathode electrodes of the positive-side main semiconductor switching elements beig connected to the anode electrodes of the negative-side main semiconductor switching elements, respectively, and output terminals of the inverter apparatus being provided at the connecting points.

DESCRIPTION OF THE PREFERRED EMBODIMENTS

Figure 1:
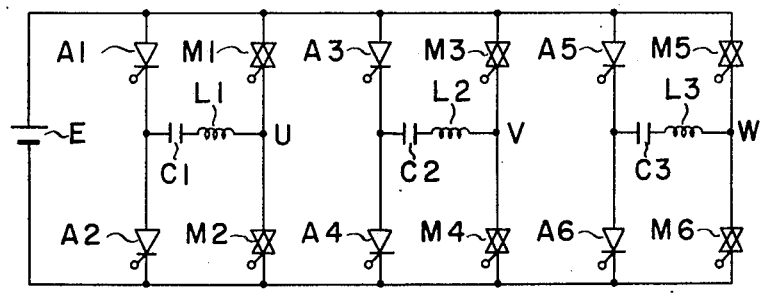
FIG. 1 is a circuit diagram showing a conventional voltage type inverter.
Figure 2:
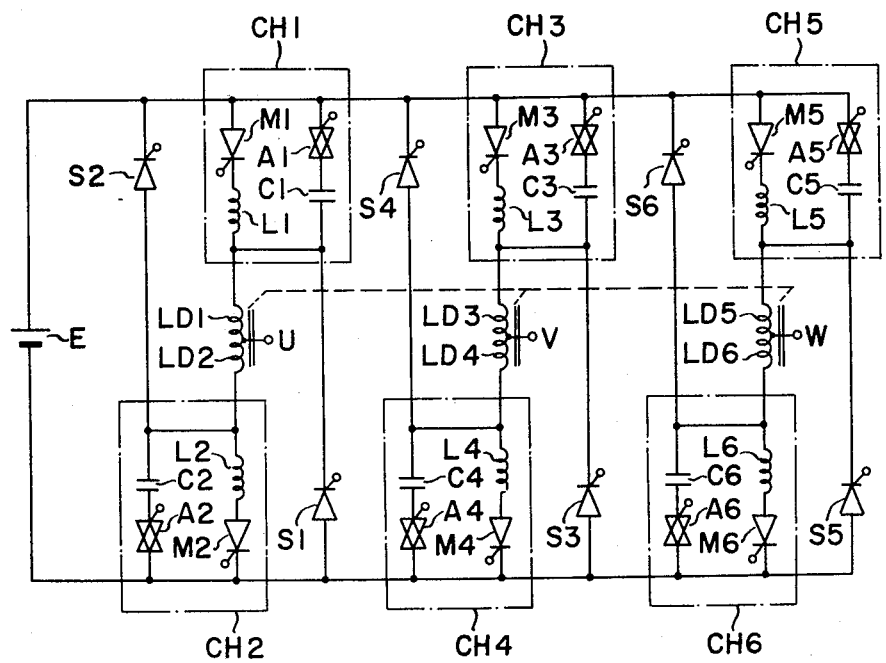
FIG. 2 is a circuit diagram showing a conventional current type inverter.
Figure 3:
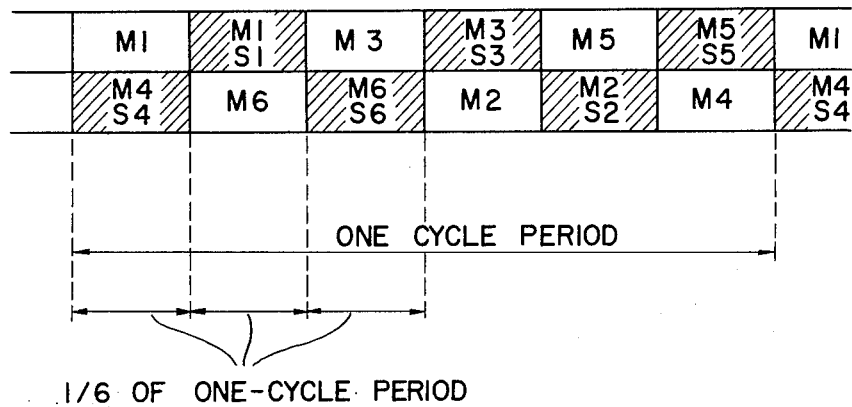
FIG. 3 is a diagram for explaining the operation of the conventional inverter shown in FIG. 2.

The current type inverter apparatus constituting a first embodiment of the present invention will now be described with reference to FIG. 4. In this embodiment, main thyristors M1 and M2, M3 and M4, and M5 and M6 are connected in series between the positive and negative buses of a DC power source E, respectively. Between the cathodes electrodes of the main thyristors M1, M3, and M5 and the anode electrodes of the main thyristors M2, M4, and M6, are connected in series smoothing reactor pairs LD1 and LD2, LD3 and LD4, and LD5 and LD6 respectively, and three phase AC output terminals U, V, and W are provided respectively at intermediate points of the serially connected reactor pairs.

A positive-side commutating circuit CC1 which is provided for the commutation of the positive-side main thyristors M1, M3, and M5 with their anode electrodes directly connected to the positive bus of the DC power source E, comprises a commutating thyristor A11 with its anode electrode directly connected to the positive bus, and a commutating reactor L11 and a commutating capacitor C11, which are connected in series and connected in parallel with the commutating thyristor A11.

Likewise, a negative-side commutating circuit CC2 used for the commutation of the negative-side main thyristors M2, M4, and M6 with their cathodes directly connected to the negative bus of the power source E, comprises a commutating thyristor A21 with its cathode electrode also connected directly to the negative bus, and a commutating reactor L21 and a commutating capacitor C21, both connected in series and connected in parallel with the commutating thyristor A21.

Between the commutating circuit CC1 and the main thyristors M1, M3, and M5, there are provided thyristors S1, S3, and S5, respectively, for circulating current in a phase-selective manner. More specifically, the anode electrodes of the current circulating thyristors S1, S3, and S5 are commonly connected to the cathode electrode of the commutating thyristor A11, while the cathode electrodes of the same thyristors S1, S3, and S5 are connected respectively to the cathode electrodes of the main thyristors M1, M3, and M5.

Likewise, there are provided phase selective, current circulating thyristors S2, S4, and S6, the cathode electrodes of which being commonly connected to the anode electrode of the commutating thyristor A21, and the anode electrodes of which being connected respectively to the anode electrodes of the negative-side main thyristors M2, M4, and M6.

A diode DW1, with its anode and cathode electrodes connected respectively to the negative bus and to the junction between the commutating reactor L11 and the commutating capacitor C11, and a diode DW2, with its cathode and anode electrodes connected respectively to the positive bus and to the junction point between the commutating reactor L21 and the commutating capacitor C21, are circulation clamping diodes which prevent overcharging of the commutating capacitors C11 and C21, and circulate load current therethrough during the interrupting periods of the main thyristors.

The operation of the inverter shown in FIG. 4 will now be described. It is assumed that a current from the positive bus of the power source E flows through the main thyristor M1, smoothing reactor LD1, output terminal U, U-phase winding of the load (not shown), W-phase winding of the load (not shown), output terminal W, and the main thyristor M6 to the negative bus of the power source E. It is further assumed that the main thyristor M1 is operating as a chopper, and that the commutating capacitor C11 is charged to a voltage of a polarity as shown in FIG. 4 and of a magnitude equal to the power source voltage.

When the commutating thyristor A11 is turned ON for turning-off the main thyristor M1, the polarity of the electric charge in the commutating capacitor C11 is reversed through a resonance circuit comprising the commutating thyristor A11, reactor L11, and the capacitor C11. When the current circulating thyristor S1 having been ignited beforehand, the polarity of the commutating capacitor C11, which has been reversed as described above, starts to be reversed again to its initial polarity through a resonance circuit comprising the commutating reactor L11, current circulating thyristor S1, and the main thyristor M1 now conducting. When the current flowing through the resonance circuit becomes equal to the load current, a reverse bias is applied to the main thyristor M1 so that the thyristor M1 terminates its conduction.

The load current which has been flowing through the main thyristor M1 now starts to flow from the positive bus through the commutating capacitor C11, commutating reactor L11, current circulating thyristor S1, and the smoothing reactor LD1. By this current, the commutating capacitor C11 is further charged to the indicated polarity. At an instant when the voltage across the capacitor C11 becomes equal to the voltage of the DC power source E, the circulation clamping diode DW1 conducts, and the load current starts to circulate from the negative bus through the circulation clamping diode DW1, commutating reactor L11, current circulating thyristor S1, smoothing reactor LD1, load terminals U and W, smoothing reactor LD6, and the main thyristor M6 to the negative bus. With this circulation, a cycle of the chopping operation of this embodiment completes.

When the main thyristor M1 again conducts, the circulating current is transferred to the main thyristor M1 at a rising-up rate (di/dt) limited by the commutating reactor L11, and the operation of this inverter apparatus is returned to its initial state where an electric energy is injected from the DC power source to the main thyristor M1. By suitably controlling the time ratio between the energy injection period and the current circulating period, the magnitude of the load current can be controlled as desired.

In a case where the load is, for instance, an electric motor inducing a back electromotive force, and when the electric motor is operated in a generator mode, the circulating current increases, and by turning-off the main thyristor M6 by the negative side commutation circuit CC2, the load current flows from the negative bus of the power source E through the circulation clamping diode DW1, commutating reactor L11, current circulating thyristor S1, smoothing reactor LD1, the load, smoothing reactor LD6, current circulating thyristor S6, commutating reactor L21, circulation clamping diode DW2 to the positive bus of the power source E, thus returning electric energy to the power source E. In this case also, the regenerated current can be controlled suitably by controlling the time ratio between the energy supplying period and the circulating period.

The phase-to-phase commutation of the inverter apparatus can be controlled as follows.

The inverter apparatus operates such that, in a state where U-phase current flows through the main thyristor M1 to the load, the main thyristor M1 is turned off, thereby circulating the current as described hereinbefore. Although in the chopper operation, the main thyristor has been again ignited, in this operation, the main thyristor M3 is ignited. Since the smoothing reactors LD1 and LD3 are closely coupled with each other, the power source voltage is applied across the U and V terminals of the load with such a polarity that the terminal V is held positive and the terminal U is held negative. Thus, the current starts to be transferred from the U phase to the V phase, and at an instant where the U phase current is reduced to zero, a reversed voltage is applied across the current circulating thyristor S1 to turn-off the same. The above described operation is further repeated for other phases thereby effecting a phase-to-phase commutation of the inverter apparatus.

Figure 5:
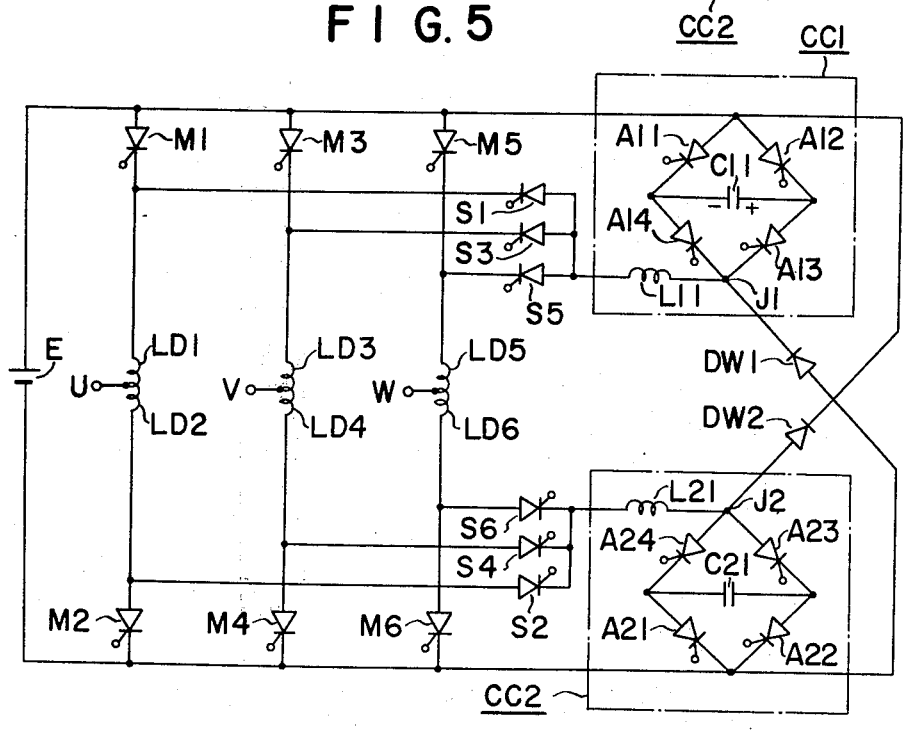
FIGS. 5 through 9 are circuit diagrams showing various embodiments of the present invention.

FIG. 5 shows a circuit diagram showing another current-type inverter apparatus, constituting a second embodiment of the present invention, wherein the parts similar to those of the first embodiment are designated by the same reference numerals.

In this embodiment, only the commutation circuits are different from the first embodiment. That is, the first commutation circuit CC1 comprises; four commutating thyristors A11, A12, A13, and A14 connected in a bridge form so that the anode electrodes of the thyristors A11 and A12 are commonly connected to the positive bus of the DC power source E, and the cathode electrodes of the thyristors A13 and A14 are commonly connected to a junction point J1; a commutating capacitor C11 connected between two intermediate junction points of the thyristor bridge; phase-selective, current circulating thyristors S1, S3, and S5, the cathode electrodes of which being connected respectively to the cathode electrodes of main thyristors M1, M3, and M5; and a commutating reactor L11 connected between the junction point J1 and the commonly connected anode electrodes of the current circulating thyristors S1, S3, and S5.

Likewise, the second commutation circuit CC2 comprises: four commutating thyristors A21, A22, A23, and A24 connected in a bridge form so that the cathode electrodes of the thyristors A21 and A22 are commonly connected to the negative bus of the DC power source E, and the anode electrodes of the thyristors A23, and A24 are commonly connected to a junction point J2; a commutating capacitor C21 connected between two intermediate junction points of the thyristor bridge; phase-selective, current circulating thyristors S2, S4, and S6, the anode electrodes of which being connected respectively to the anode electrodes of main thyristors M2, M4, and M6; and a commutating reactor L21 connected between the junction point J2 and the commonly connected cathode electrodes of the current circulating thyristors S2, S4, and S6.

In the above described circuit of FIG. 5, the commutation (inclusive of chopping operation) is carried out upon ignition of the commutating thyristor pair A11 and A13 or A12 and A14. That is, when the commutating capacitor C11 is charged to the indicated polarity, the thyristors A11 and A13 are ignited, and when the capacitor C11 is charged to the opposite polarity, the thyristors A12 and A14 are ignited. At this time, by the ignition of, for instance, the current circulating thyristor S1 corresponding to the now conducting main thyristor M1, resonance circuit is established through the main thyristor M1, thus turning-off the main thyristor M1. As will be apparent from the above description, since the polarity of the commutating capacitor C11 is reversed upon completion of a single commutation, the commutating operation of this inverter apparatus can be carried out at a high efficiency by igniting two sets of commutating thyristors alternately. Furthermore, in this embodiment, the commutating reactors L11 and L21 may be proportioned such that the riserate (di/dt) of the currents flowing through the commutating thyristors A11 through A14 and A21 through A24, and also of the currents passing through the current circulating thyristors S1 through S6 can be alleviated.

Figure 4:
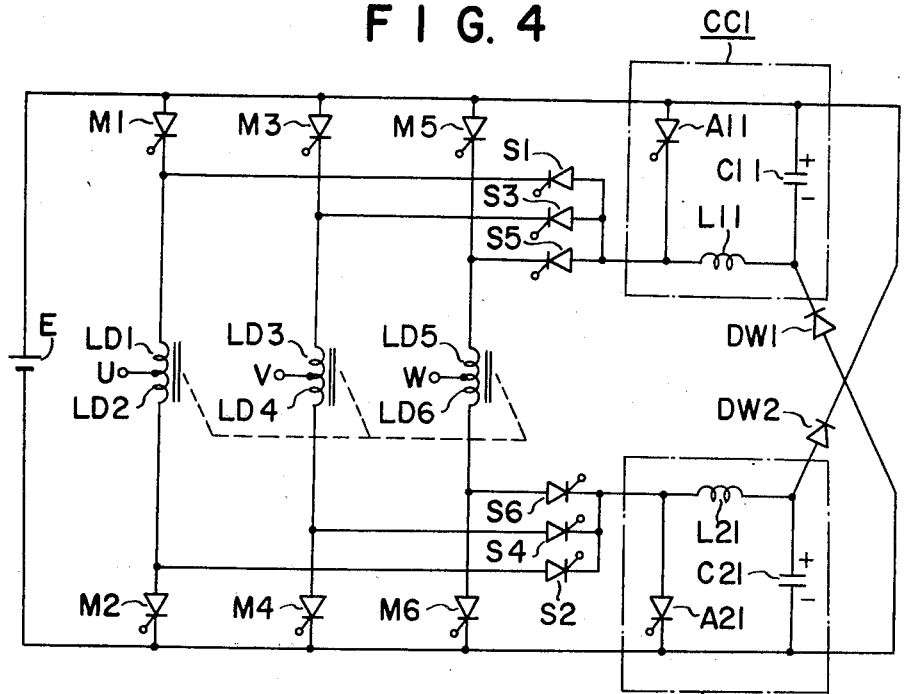
FIG. 4 is a circuit diagram showing one embodiment of the present invention.

While the polarity of the commutating capacitors C11 and C21 in the circuit shown in FIG. 4 has been reversed twice in each commutation period, the polarity of the commutating capacitors C11 and C21 in the circuit shown in FIG. 5 is reversed only once in each commutating period. As a result, the capacity (KVA) of the commutating capacitors can be reduced to one half of that of the former capacitors, and furthermore the commutation period (inclusive of the chopper period) can be shortened. Accordingly, the chopper frequency can be increased, thereby allowing a faster control of the output current and increasing the upper limit of the output frequency. Furthermore, the inductances of the smoothing reactors LD1 through LD6 can be reduced.

Although in the embodiments shown in FIGS. 4 and 5, main thyristors M1 through M6 of a reverse-current blocking type (ordinary type) have been used, composite main thyristors each comprising a diode connected antiparallel with a thyristor, (hereinafter termed a reverse-conductive thyristor) may also be used. In the latter case, however, the main thyristors which should be kept blocked (in the forward direction) tend to conduct reversely depending on the phase angle of the induced voltage of an electric motor constituting the load, thereby disturbing the smoothing effect of the smoothing reactors. Such an arrangement may be used only in such applications where the above described shortcoming does not seriously hamper the operation of the inverter.

Figure 6:
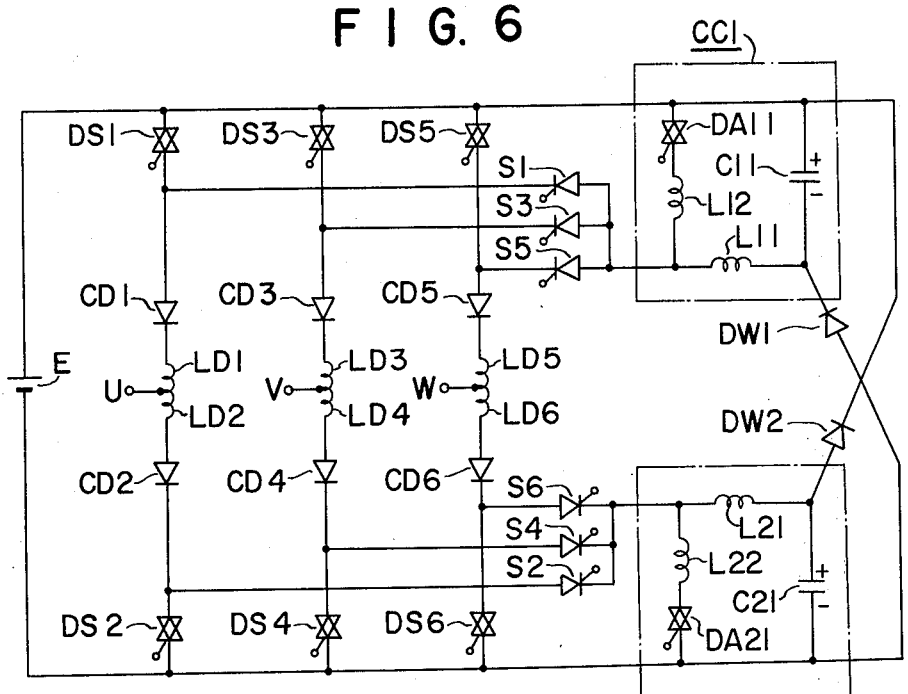

In FIG. 6, there is illustrated still another embodiment of the present invention wherein the adverse effect in the smoothing function can be eliminated regardless of the use of the reverse-conductive thyristors of from DS1 to DS6 as the main thyristors. In this embodiment, for the purpose of preventing the reverse conduction of the main thyristors DS1 through DS6 due to the induced voltage in the load, reverse current blocking diodes CD1 through CD6 are connected in series with the main thyristors DS1 through DS6, respectively. In this embodiment, the commutating thyristors DA11 through DA21 are also of the reverse-conductive type and are connected in series with reactors L21 and L22, respectively. The commutating circuits CC1 and CC2 of this embodiment may otherwise be of the same construction as those of FIG. 4. However, since the turn-off period of the ordinary type thyristors is longer than that of the reverse-conductive type thyristors, and since the resonance frequency of the commutating circuit must be determined in accordance with the turn-off period of the commutating thyristors, the merit obtainable by the use of the reverse-conductive type main thyristors is substantially reduced. For this reason, the commutating thyristors DA11 and DA21 of this embodiment are also take the form of the reverse-conductive type, and furthermore, in order to prevent the unsure turning-off of the main thyristors due to the divided flow of the reverse currents from the commutating capacitors C11 and C21 into the main thyristors and also into the commutating thyristors, divided flow (or by-pass) preventing reactors L12 and L22 are connected in series with the commutating thyristors DA11 and DA21, respectively.

It is also possible to construct the commutation circuits CC1 and CC2 of this embodiment to be identical to those used in the previous embodiment shown in FIG. 5.

Figure 7:
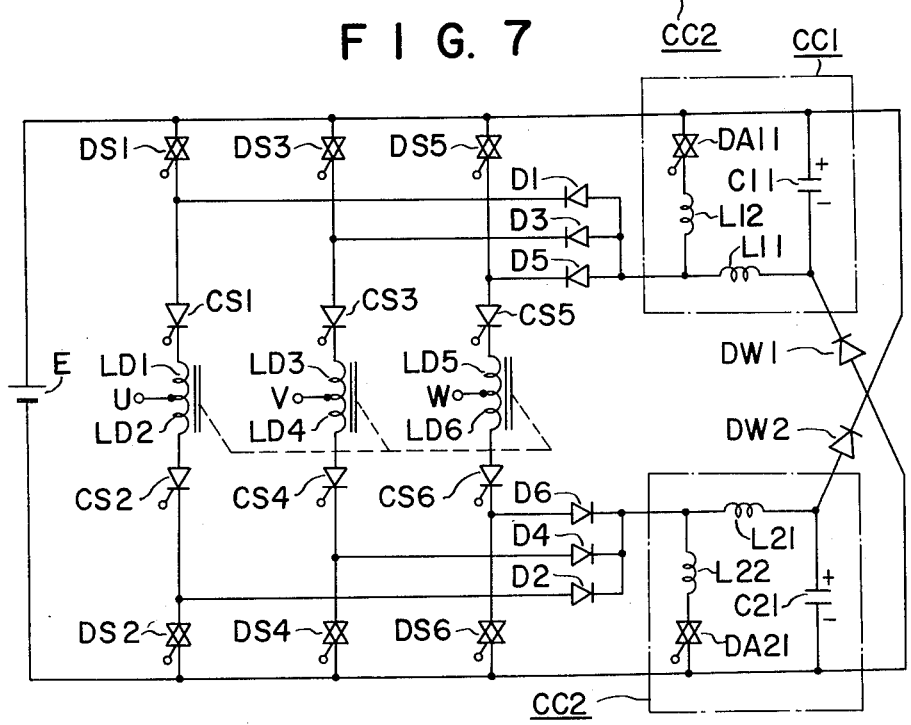

In FIG. 7, there is illustrated still another embodiment of the present invention wherein diodes D1 through D6 are used instead of the current circulating thyristors S1 through S6 in the circuit of FIG. 6, and thyristors CS1 through CS6 are used instead of the reverse-current blocking diodes CD1 through CD6. The remaining parts of the circuit are quite similar to that of the embodiment shown in FIG. 6.

In the embodiment shown in FIG. 7, the chopper operation is carried out as follows.

It is assumed that a load current is flowing from the positive bus of the power source E through the main thyristor DS1, thyristor CS1, smoothing reactor LD1, output terminal U, U-and V-phase windings of the load (not shown), output terminal W, smoothing reactor LD6, thyristor CS6, and the main thyristor DS6 to the negative bus of the power source E. It is also assumed that the commutating capacitor C11 is charged to a voltage of a magnitude substantial equal to that of the power source E and of a polarity as shown in FIG. 7.

In this condition, if the commutating thyristor DA11 is ignited for turning-off the main thyristor DS1, the polarity of the commutating capacitor C11 is reversed through a resonance circuit comprising the commutating thyristor DA11 and the reactors L12 and L11. The electric charge thus reversed in the commutating capacitor C11 flows through two branches, one including the commutating reactor L11, diode D1, and the main thyristor DS1, and the other including the by-pass current blocking reactor L12 and the commutating thyristor DA11, so that the polarity of the commutating capacitor C11 is thereafter changed for the second time to its initial polarity. However, by the action of the by-pass current blocking reactor L12, most part of the current flows through the main thyristor DS1. In this case, although serially connected circuits comprising respectively the diodes D3 and D5 and the main thyristors DS3 and DS5 are also established, the cathode potentials of the diode parts of the reverse-conductive type main thyristors DS3 and DS5 are held at a value lower than that of the positive bus of the power source E. Therefore, no current flows through these two circuits.

When the reverse current flowing through the main thyristor DS1 becomes greater than the load current, the main thyristor DS1 conducts in the reverse direction, and from this time on, the reverse current flows through a branch including the main thyristors DS1, DS3, and DS5, and the commutating thyristor DA11, thereby continuing the polarity reversing operation of the electric charge. Thus, the main thyristor DS1 and the commutating thyristor DA11 recover their normal direction-blocking capability and are turned off. When the reverse current is again reduced to a value equal to the load current, since the main thyristor DS1 has been turned off, the load current from the positive bus starts to flow through the commutating capacitor C11, commutating reactor L11, and the diode D1 to the thyristor CS1. By this current, the commutating capacitor C11 is further charged to the polarity as shown. Thus, when the voltage across the commutating capacitor becomes equal to the voltage of the DC power source E, the circulation clamping diode DW1 conducts, thereby circulating the load current from the negative bus through the circulation clamping diode DW1, commutating reactor L11, diode D1, thyristor CS1, smoothing reactor LD1, load, smoothing reactor LD6, and main thyristor DS6, toward the negative bus of the power source E, and one chopping operation of the main thyristor DS1 completes.

When the main thyristor DS1 is again ignited, the circulating current is transferred to the main thyristor DS1 while the rising rate (di/dt) is being alleviated by the commutating reactor L11, and the circuit is returned to its initial condition where an electric energy starts to be injected from the power source E. By controlling the time ratio between the two circuit conditions, one for the injection of the energy and the other for the circulation of current, the magnitude of the load current can be controlled as desired.

Furthermore, in a case where the load is an AC motor which induces back electromotive force and the current of which is regenerated when the motor is operated as a generator, turning-off of the main thyristor DS6 by means of the negative side commutation circuit CC2 causes a load current to flow from the negative bus of the power source E through the circulation clamping diode DW1, commutating reactor L11, diode D1, reverse-current controlling thyristor CS1, smoothing reactor LD1, load, smoothing reactor LD6, reverse-current controlling thyristor CS6, diode D6, commutating reactor L21, and the circulation clamping diode DW2 to the positive bus of the DC power source E, thus regenerating electric power to the DC power source. In this case also, the regenerating current can be controlled by controlling the time ratio suitably.

The interphase commutation, of this embodiment is carried out as follows.

In a condition wherein a current flows through the main thyristor DS1 to the U-phase of the load, the main thyristor DS1 is turned off thereby circulating the current. Although in the chopper operation described above, the main thyristor DS1 has been ignited again, in the interphase commutation operation, the main thyristor DS3 and the reverse-current controlling thyristor CS3 are ignited. Since the smoothing reactors LD1 and LD3 are closely coupled each other, the power source voltage is applied between the U-phase and V-phase of the load. Thus, the load current is transferred from the U-phase to the V-phase, and at an instant when the U-phase current becomes zero, the thyristor CS1 is turned off under application of a reverse voltage.

Although on-off operations of the main thyristor DS1 during the chopping period and the interphase commutation period have been described hereinabove exemplarily, it is apparent that the same operations can be repeated for other main thyristors for accomplishing the chopper operations and the interphase commutating operations of this embodiment.

It will be apparent that the commutation circuits in the embodiment shown in FIG. 7 may otherwise be replaced with the commutation circuits shown in FIG. 5, and in this case, advantageous features same as those described with respect to the embodiment of FIG. 5 can be obtained.

In the above described embodiments shown in FIGS. 4, 6, and 7, initial charging of the commutating capacitors can be attained by merely providing charging resistors in parallel with the circulation clamping diodes DW1 and DW2, respectively. Since only the initial charging currents of the capacitors flow through the charging resistors, and since no current flows. Therethrough during the main part of the operation, the charging resistors may be of a low capacity. In the embodiment shown in FIG. 5, the initial charging of the commutating capacitors is carried out in a sequential manner.

Furthermore, the smoothing reactors LD1 through LD6 may be so constructed that the magnetic cores for the reactors LD1, LD3, and LD5 are independent of the magnetic cores of the reactors LD2, LD4, and LD6, respectively, or the inductances of either one of the two groups LD1, LD3, LD5, and LD2, LD4, LD6 may be reduced to zero or such one group may be omitted in entirety without deteriorating the operation of the inverter to any appreciable extent. Furthermore, in a case where two or more loads are driven by the inverter, some of the loads may be energized from the opposite terminals of the smoothing reactors, thereby improving the utility factor of the smoothing reactors.

Figure 8:
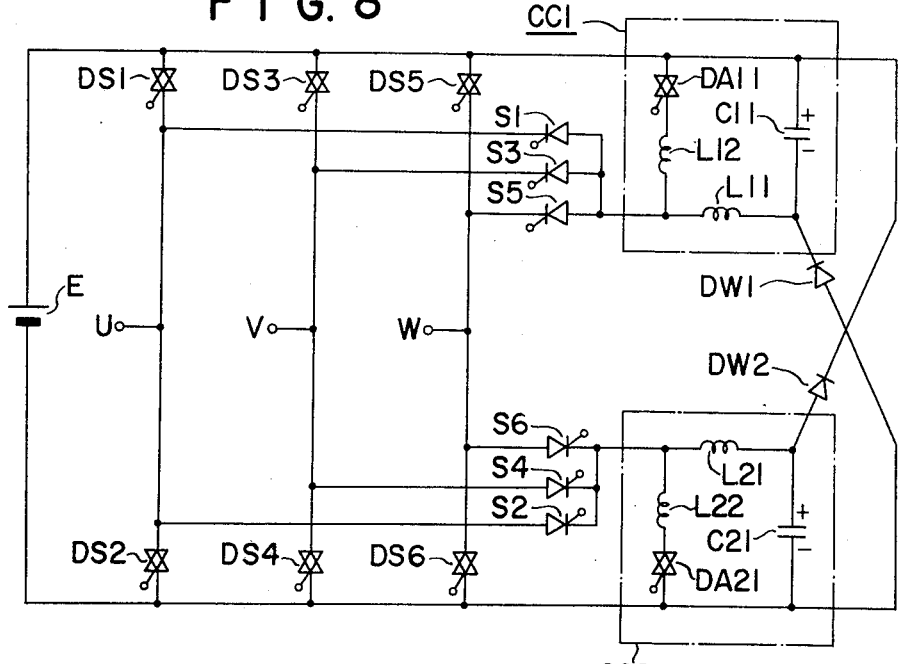

In FIG. 8, there is illustrated still another embodiment of the present invention, which is of a voltage type inverter, wherein like parts as in FIG. 6 are designated by the same reference characters.

The embodiment shown in FIG. 8 is of a construction wherein smoothing reactors LD1 through LD6 and diodes CD1 through CD6 are omitted from the circuit of FIG. 6, but the fundamental operation of this embodiment is similar to that of FIG. 6.

More specifically, the operation of this embodiment in a case wherein the main thyristor DS1 is firstly ignited to pass a current through the U-phase of the load, and then the thyristor DS1 is turned off while the commutating capacitor C11 is charged to the indicated polarity is as follows.

By igniting the commutating thyristor DA11, the polarity of the electric charge in the commutating capacitor C11 is reversed through a resonance circuit comprising the commutating thyristor DA11, commutating reactor L11, and the by-pass current blocking reactor L12. With the phase selective, current circulating thyristor S1 having been ignited, the electric charge thus reversed of the commutating capacitor C11 again starts to be reversed to its initial polarity through a serially connected circuit comprising the commutating reactor L11, current circulating thyristor S1, and the main thyristor DS1, and also through another serially connected circuit comprising the by-pass blocking reactor L12 and the commutating thyristor DA11. Since the by-pass blocking reactor L12 is provided for reducing the by-pass current flowing through the commutating thyristor DA11 during this time period, most of the current flows through the main thyristor DS1. Where this current becomes greater than the load current, the main thyristor DS1 conducts in the reverse direction, and therefore the main thyristor DS1 and the commutating thyristor DA11 recover their blocking capability of the current flowing in the forward direction. That is, the two thyristors are turned off. The polarity reversing current of the capacitor C11 is again reduced, and since the main thyristor DS1 is turned off as described above, the load current starts to flow from the positive bus through the commutating capacitor C11, commutating reactor L11, and the current circulating thyristor S1. By this current, the commutating capacitor C11 is further charged to the indicated polarity, and at an instant when the voltage across the commutating capacitor C11 becomes equal to the voltage of the DC power source E, the circulation clamping diode DW1 conducts. Thus, the load current from the negative bus starts to flow through the circulation clamping diode DW1, commutating reactor L11, and the current circulating thyristor S1, thereby bringing the potential of the output terminal U to that of the negative bus and terminating one commutating operation (inclusive of a chopping operation). When the main thyristor DS1 is again ignited, the current thus circulating is transferred to the main thyristor DS1 while the rising rate (di/dt) is alleviated by the commutating reactor L11, and the operation is returned to its initial stage. Other main thyristors of the positive-side, such as DS3 and DS5, can also be turned off by selectively igniting the phase selective, current circulating thyristors S3 and S5. Furthermore, simultaneous turning-off of these main thyristors is possible by igniting two phase selective, current circulating thyristors at the same time.

The negative-side main thyristors DS2, DS4, and DS6 are likewise turned-off by the phase selective, current circulating thyristors S2, S4, and S6, and the circulation clamping diode DW2 and the commutating circuit CC2. Although in the circuit shown in FIG. 8, the reverse-conductive type thyristors are used for the main thyristors DS1 through DS6 and for the commutating thyristors DA11 and DA12, it is of course possible to use simple ordinary reverse blocking type thyristors in which case the reverse-blocking reactors L12 and L22 are not necessary. In the case when the main thyristors and the commutating thyristors are both of the reverse blocking (ordinary type) thyristors, the commutating operation is somewhat different from that described above, and since the main thyristors are not conductive in the reverse direction, even at an instant when the reversing current becomes equal to the load current, during the second polarity reversing operation of the commutating capacitors C11 and C21, the load current directly flows through the commutating capacitor, and the commutating operation is completed when the same capacitors are charged to the DC power source voltage. Accordingly, the main thyristors can be freely and selectively turned off, and the control of providing an output of positive or negative waveform can be realized at high efficiency by applying the technique of the pulse-width modulation.

Figure 9:
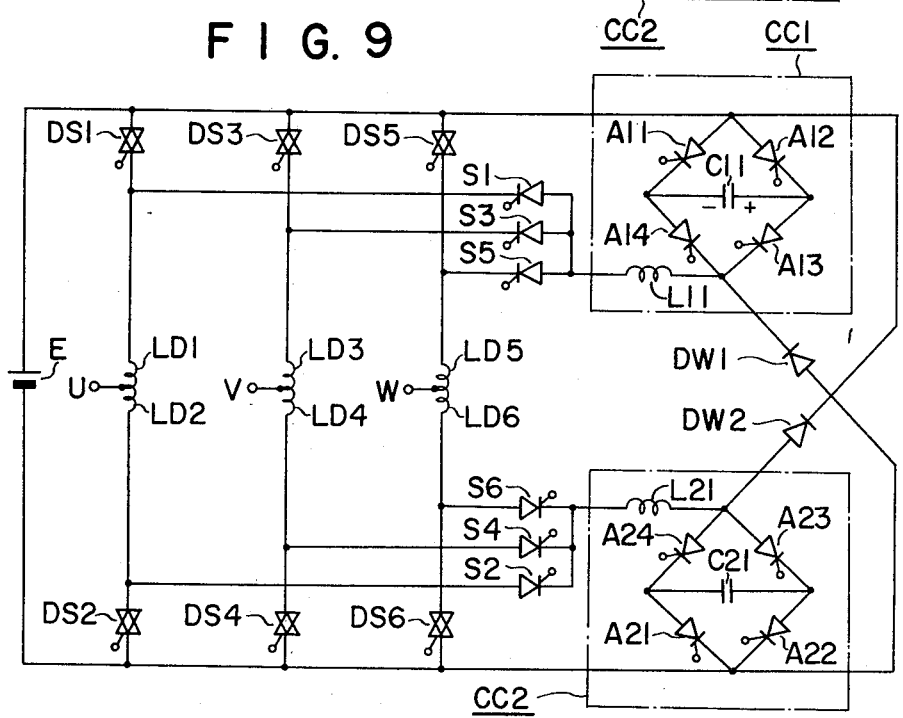

In FIG. 9, illustrates a voltage type inverter apparatus which constitutes still another embodiment of the present invention. In the case of ordinary inverter apparatus wherein an AC motor is driven under a pulse-width modulation control and the like, since the impedance of the AC motor for the modulation frequency is low, a comparatively large current flows through the AC motor. For preventing such a disadvantage, reactors acting as a filter have been frequently inserted between the output terminals of the inverter apparatus and the input terminals of the AC motor.

This embodiment is intended to include such reactors within the inverter apparatus, thereby to provide a filter effect, and also to facilitate the protection of the circuit by limiting the magnitude of short-circuit current and its rizing rate when a power source short-circuit is caused by the conduction of both the positive-side and negative-side main thyristors by for instance a commutation failure which, as is well known, is a shortcoming of the conventional inverter apparatus.

In this embodiment, since the commutating circuits as shown in FIG. 5 are used, the pulse-width modulation control can be obtained even in a high frequency range of the modulation frequency, and furthermore the upper limit of the output frequency can be thereby elevated. In the circuit shown in FIG. 9, reactors LD1 and LD2, reactors LD3 and LD4, and reactors LD5 and LD6 are alternately inserted in series with the load circuits depending on the sense of the output current thereby acting as filters. At the time of a commutation failure and the like, the reactors LD1 and LD2, LD3 and LD4, and LD5 and LD6 are respectively connected in series thereby alleviating the rising rate of the short-circuit current. The reactors also alleviate the rise rate (dv/dt) of the voltage of the other-side main thyristor when a main thyristor is ignited. In the conventional inverter, the insertion as described above of the reactors was not possible because of hampering the opertion of the commutation circuits.

In the commutating operation, if the commutating capacitor C11 is charged to exhibit a polarity as shown in FIG. 9, the ignition of two commutating thyristor A11 and A13 together with a phase selective, current circulating thyristor causes an instantaneous establishment of a resonance circuit through the phase selective, current circulating thyristor, the positive-side main thyristor selected thereby, and the commutating reactor L11, thus turning-off the main thyristor. After a commutation, the polarity of the commutating capacitor C11 is reversed from that shown in FIG. 9. Thus, in the immediately following commutation period, commutating thyristors A12 and 14 are ignited together with a phase selective, current circulating thyristor. By igniting and commutating two commutating thyristors in a manner described above, the reversed charge in the commutating capacitor can be utilized effectively. In this case also, the main thyristors can be composed simply of the reverse-blocking type (ordinary type) thyristors, and in such a case, the commutating reactors L11 and L21 may be of such capacity that can limit the rise-rate (di/dt) of the current flowing through the commutating thyristors.

Furthermore, in the commutating circuits of the embodiment shown in FIG. 8, initial charging of the commutating capacitors for starting the inverter operation can be accomplished simply by connecting initial charging resistors in parallel with the circulation clamping diodes DW1 and DW2, respectively.

I claim:

1. An inverter apparatus comprising: at least two positive-side main semicondutor switching elements (M1, M3, M5), the anode electrodes thereof being connected to a positive bus; at least two negative-side main semiconductor switching elements (M2, M4, M6), the cathode electrodes which thereof being connected to a negative bus; positive-side phase selective, current circulating semi-conductor elements of a unidirectional conductivity type, the anode electrodes thereof being commonly connected together and the cathode electrodes thereof being connected respectively to the cathode electrodes of the positive-side main semiconductor switching elements; negative-side, phase selective, current circulating semiconductor elements of (S2, S4, S6) a unidirectional conductivity type, the cathode electrodes thereof being commonly connected together and the anode electrode thereof being connected respectively to the anode electrodes of the negative-side main semiconductor switching elements; a positive-side commutating circuit (CC1) including a commutating capacitor C11 for supplying a reverse current to each of said positive-side main semiconductor switching elements (M1, M3, M5) through corresponding one of said positive-side, phase selective, current circulating, semiconductor elements (S1, S3, S5) of a unidirectional conductivity type from said positive bus during the commutation period of said positive-side, main semiconductor switching elements (M1, M3, M5); a negative-side commutating circuit (CC2) including a commutating capacitor for supplying a reverse current of each of said negative-side main semiconductor switching elements (M2, M4, M6) through corresponding one of said negative-side, phase selective, current circulating, semiconductor elements (S2, S4, S6) of a unidirectional conductivity type from said negative bus during the commutation period of said negative-side main semiconductor switching elements (M2, M4, M6); a positive-side circulation-clamping diode (DW1), the anode electrode thereof being connected to said negative bus, and the cathode electrodes thereof being connected to said positive-side commutating circuit (CC1), for preventing said commutating capacitor (C11) of said positive-side commutating circuit (CC1) from being overcharged, and a negative-side circulation clamping diode (DW2), the cathode electrode thereof being connected to said positive bus, and the anode electrode thereof being connected to said negative-side commutating circuit (CC2), for preventing said commutating capacitor (C21) of said negative-side commutating circuit (CC2) from being overcharged; the cathodes of said positive-side main semiconductor switching elements (M1, M3, M5) being connected to the anode electrodes of said negative-side main semiconductor switching elements (M2, M4, M6), respectively; and output terminals of said inverter apparatus (U, V, W) provided at said connecting points.

2. An inverter apparatus as set forth in claim 1 wherein said positive-side, phase selective, current circulating semiconductor elements (S1, S3, S5) of a unidirectional conductivity type, and said negative-side, phase selective, current circulating semiconductor elements (S2, S4, S6) of a unidirectional conductivity type comprise thyristors.

3. An inverter apparatus as set forth in claim 1 wherein said positive-side, phase selective, current circulating semiconductor elements (S1, S3, S5) of a unidirectional conductivity type, and said negative-side, phase selective, current circulating semiconductor elements (S2, S4, S6) of a unidirectional conductivity type comprise diodes.

4. An inverter apparatus as set forth in claim 1 wherein the cathode electrodes of said positive-side main semiconductor switching elements (M1, M3, M5) are connected directly with the anode electrodes of said negative side main semiconductor switching elements (M2, M4, M6), respectively.

5. An inverter apparatus as set forth in claim 1 wherein said cathode electrodes of said positive-side main semiconductor switching elements (M1, M3, M5) are connected to the anode electrodes of said negative-side main semiconductor switching elements (M2, M4, M6), respectively, through a corresponding number of reactors, (LD1-LD2, LD3-LD4, LD5-LD6), and said output terminals (U, V, W) are provided at intermediate points of said reactors.

6. An inverter apparatus as set forth in claim 1 wherein said positive-side commutating circuit (CC1) comprises a commutating thyristor (A11) with its anode electrode directly connected to the positive bus, and the cathode electrodes directly connected to the anode electrodes of said positive-side, phase selective, current circulating, semiconductor elements (S1, S3, S5) of a unidirectional conductivity type, and a serially connected circuit comprising said commutating capacitor (C11) and a commutating reactor (L11), which are connected in parallel across said commutating thyristor (A11), a junction between said commutating capacitor (C11) and said commutating reactor (L11) being connected with the cathode electrode of said positive-side circulation clamping diode (DW1), and wherein said negative-side commutating circuit (CC2) comprises a commutating thyristor (A21), with its cathode electrodes directly connected to the negative bus, and the anode directly connected to the cathode electrodes of said negative-side, phase selective, current circulating, semiconductor elements (S2, S4, S6) of a unidirectional conductivity type, and a serially connected circuit comprising said commutating capacitor (C21) and a commutating reactor (L21) which are connected in parallel across said commutating thyristor (A21), a junction between said commutating capacitor (C21) and said commutating reactor (L21) being connected with the anode electrode of said negative-side circulation clamping diode (DW2).

7. An inverter apparatus as set forth in claim 1 wherein said positive-side commutating circuit (CC1) comprises four bridge-connected thyristors (A11, A12, A13, A14), the anodic junction of said bridge connected thyristors being connected directly with said positive bus, and the cathodic junction of said bridge connected thyristors being connected through a commutating reactor (L11) to the anode electrodes of said positive-side, phase-selective, current-circulating, semiconductor elements (S1, S3, S5) of a unidirectional conductivity type, and connected with the cathode electrode of said positive-side circulation clamping diode (DW1), while said commutating capacitor (C11) is connected across other diagronally opposite junctions of said bridge, and wherein said negative-side commutating circuit (CC2) comprises four bridge-connected thyristors (A21, A22, A23, A24), the cathodic junction of which being connected directly with said negative bus, and the anodic junction of which being connected through a commutating reactor (L21) to the cathodes of said negative-side phase selective, current circulating, semiconductor elements (S2, S4, S6) of a unidirectional conductivity type, and connected with the anode electrode of said negative-side circulation clamping diode (DW2), while said commutating capacitor (C21) is connected across other diagronally disposed junctions of said bridge.

8. An inverter apparatus as set forth in claim 6 wherein said at least two positive-side main semiconductor switching elements (M1, M3, M5), at least two negative-side main semiconductor switching elements (M2, M4, M6), said positive-side and negative-side, phase selective, current circulating semiconductor elements (S1, S3, S5, S2, S4, S6) of a unidirectional conductivity type, and said commutating thyristors (A11, A21) in said positive-side and negative-side commutating circuits (CC1, CC2), comprise ordinary type thyristors.

9. An inverter apparatus as set forth in claim 7 wherein said at least two positive-side main semiconductor switching elements (M1, M3, M5), at least two negative-side main semiconductor switching elements (M2, M4, M6), said positive-side and negative-side, phase selective, current circulating semiconductor elements (S1, S3, S5, S2, S4, S6) of a unidirectional conductivity type, and said commutating thyristors (A11, A12, A13, A14, A21, A22, A23, A24) in said positive side and negative-side commutating circuits (CC1, CC2) comprise ordinary type thyristors.

10. An inverter apparatus as set forth in claim 6 wherein said at least two positive-side main semiconductor switching elements (DS1, DS3, DS5), at least two negative-side main semiconductor switching elements (DS2, DS4, DS6), and said commutating thyristors (DA11, DA21) in said positive-side and negative-side commutating circuits (CC1, CC2), comprise reverse-conductive type thyristors, a reverse current blocking diode (CD1, CD3, CD5, CD2, CD4, or CD6) is connected between each of said reverse-conductive type main thyristors (DS1, DS3, DS5, DS2, DS4, or DS6) and one of said output terminals (U, V, W), a reverse-current blocking reactor (L12, or L22) is connected between the reverse-conductive commutating thyristor (DA11, or DA12) and said commutating reactor (L11, or L21) in each of said positive-side and negative-side commutating circuits (CC1, CC2), and wherein said positive-side and negative-side, phase selective, current circulating, semiconductor elements (S1, S3, S5, S2, S4, S6) of a unidirectional conductivity type comprise ordinary type thyristors.

11. An inverter apparatus as set forth in claim 6 wherein said at least two positive-side main semiconductor switching elements (DS1, DS3, DS5), at least two negative-side main semiconductor switching elements (DS2, DS4, DS6), and said commutating thyristors (DA11, DA21) in said positive-side and negative-side commutating circuits (CC1, CC2) comprise reverse-conductive type thyristors, a reverse current blocking thyristors (CS1, CS3, CS5, CS2, CS4, or CS6) is connected between each of said reverse-conductive main thyristors (DS1, DS3, DS5, DS2, DS4, DS6) and one of said output terminals (U, V, W), a reverse-current blocking reactor (L12 or L22) is connected between the reverse-conductive type commutating thyristor (DA11 or DA21) and said commutating reactor (L11 or L21) in each of said positive-side and negative-side commutating circuits (CC1, CC2) and wherein said positive-side and negative-side, phase selective, current circulating, semiconductor elements (D1, D3, D5, D2, D4, D6) of a unidirectional conductivity type comprise diodes.

* * * * *

UNITED STATES PATENT AND TRADEMARK OFFICE
CERTIFICATE OF CORRECTION

PATENT NO. : 4,264,952
DATED : April 28, 1981
INVENTOR(S) : Ryoichi Kurosawa

It is certified that error appears in the above—identified patent and that said Letters Patent is hereby corrected as shown below:

On the title page, the descriptive figure should appear as shown below:

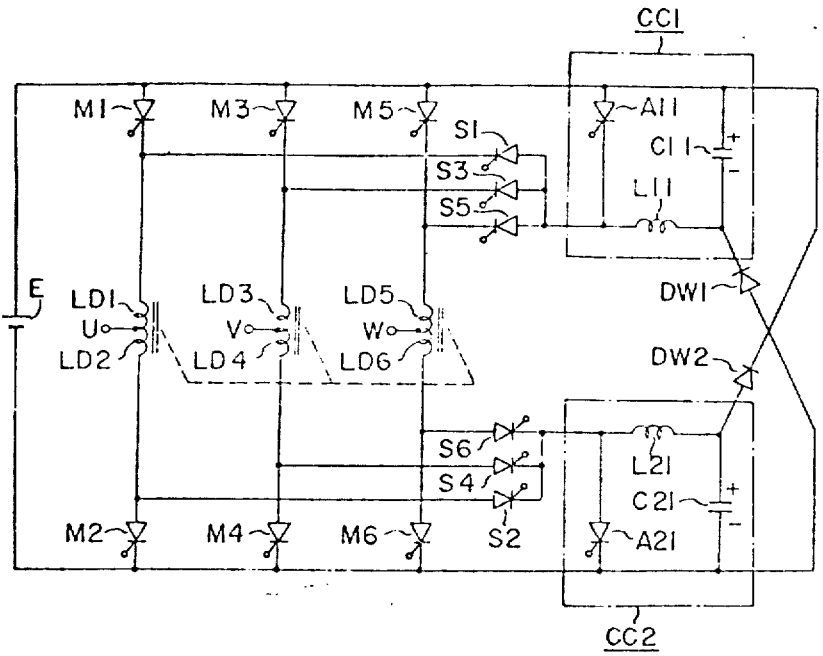

[SEAL]

Signed and Sealed this

Eighteenth Day of August 1981

*Attest:*

*Attesting Officer*

GERALD J. MOSSINGHOFF

*Commissioner of Patents and Trademarks*